3,301,464
CONTAINER AND LID

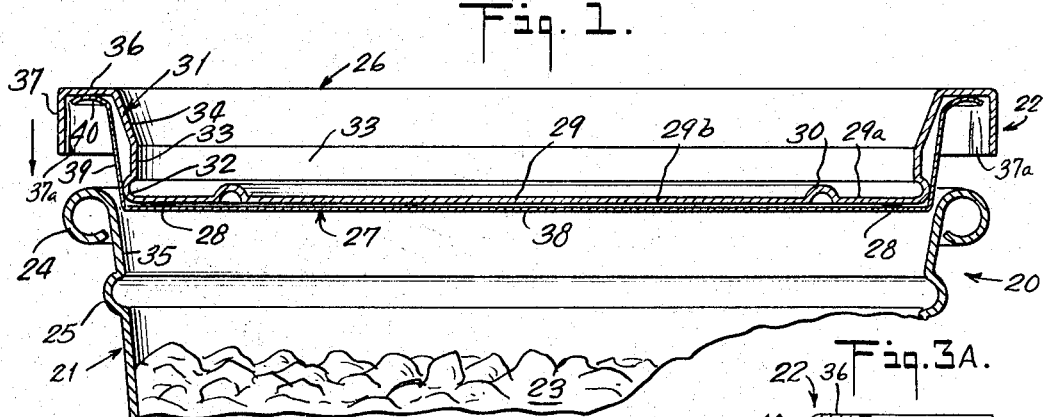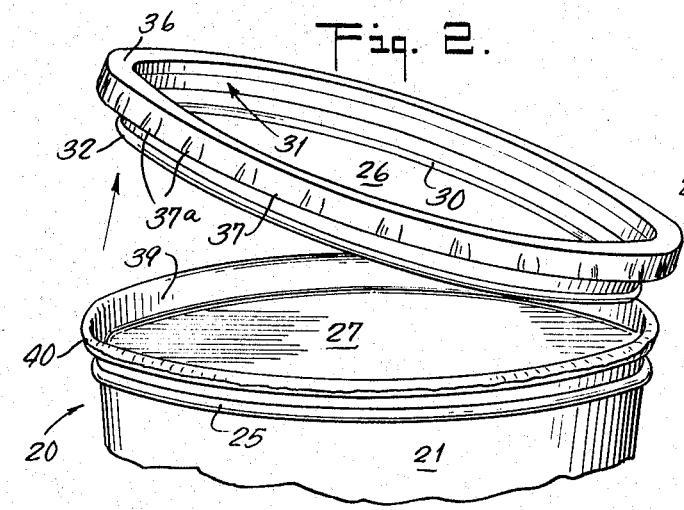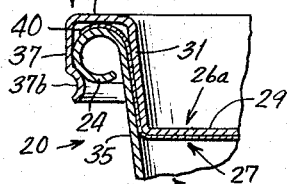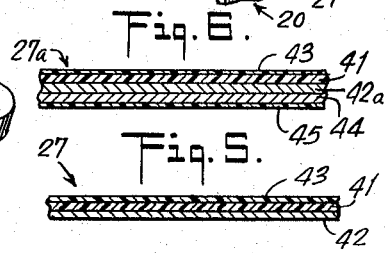

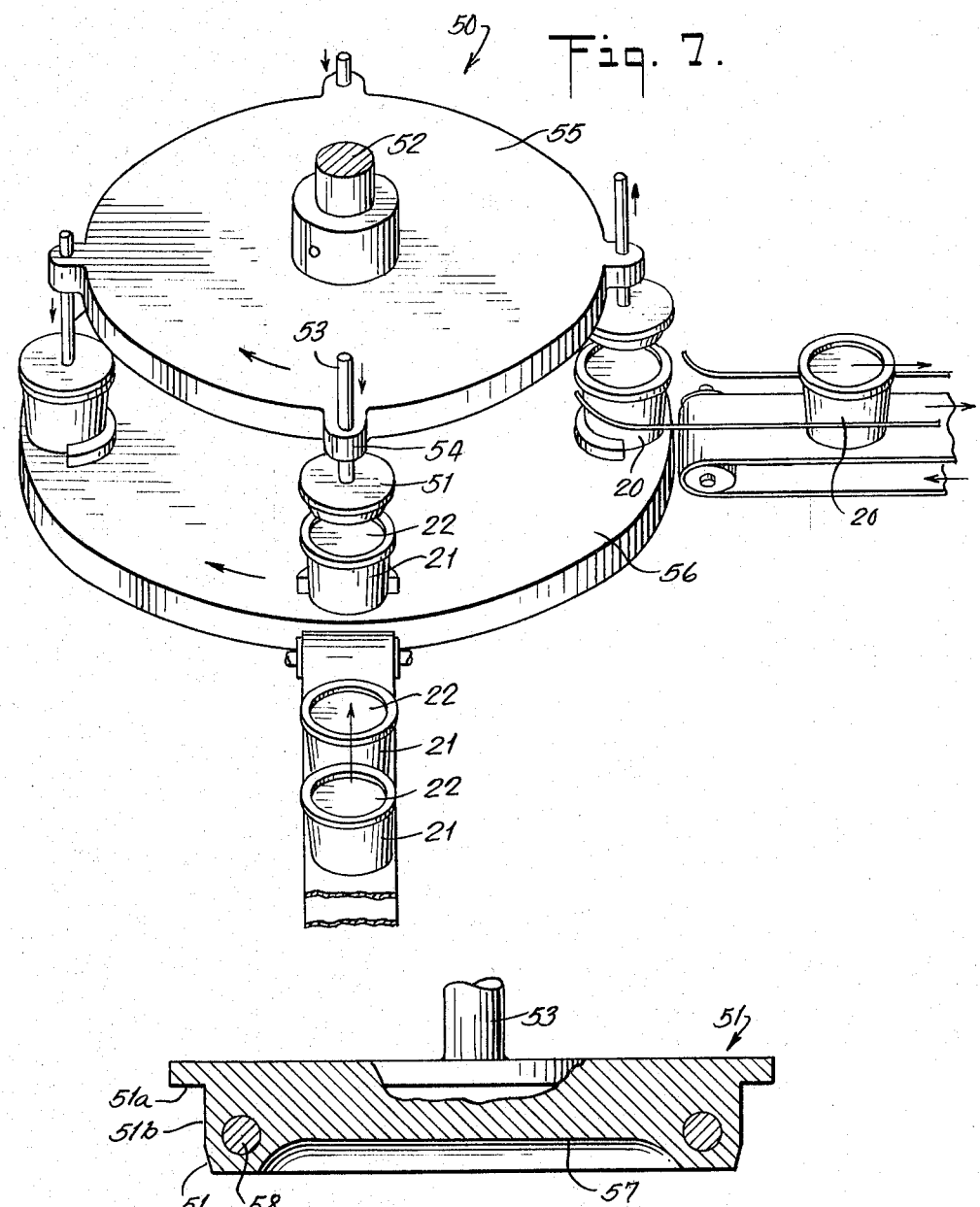

Stephen W. Amberg, St. James, N.Y., assignor to Lily-Tulip Cup Corporation, New York, N.Y., a corporation of Delaware
Filed Mar. 3, 1964, Ser. No. 349,071
15 Claims. (Cl. 229—43)

This invention relates to a container such as might be used to package comestibles or the like, and more particularly to a container having an improved closure or lid.

Cottage cheese, butter, fruit salad and similar comestible items are commonly packaged and marketed in a container having a receptacle part of wax-coated or wax-impregnated paper, or of plastic, and a lid of similar material which is pressed on to the receptacle part as snugly as possible so as to minimize the entry of air or the escape of liquid and gases from the closed container. Lids for such purpose as have been used are either plain disc-like lids which engage a peripherally extending lid-locking bead located below the mouth rim of the receptacle part, or so-called flush-type lids which fit across the top of the receptacle part mouth and have a depending skirt for snap-on engagement with the beaded mouth rim of the receptacle, or so-called plug-type lids which project into the receptacle part but also include a wall portion and a skirt which substantially surround and engage the receptacle part beaded mouth rim in snap-on relation. Where flush-type or plug-type lids have been used, the lid is sometimes provided with a gasket or the like in an attempt to improve the seal.

Such lids do not provide satisfactorily air and liquid tight containers, and thus the normal so-called "shelf-life" of the package is materially reduced in view of the relatively high degree of likelihood of food spoilage and waste prior to sale.

In addition, such prior lids are difficult to initially remove in view of the inordinately tight fitting relation between the pressed on lid and the receptacle part as is necessary in the original packaging to minimize leakage through the seal. Removal of the tight fitting lid more often results in distortion or other mutilation by the housewife of the lid itself, and sometimes of the beaded mouth rim of the receptacle part. Such partial destruction or mutilation in turn discourgaes her from reusing the original lid to cover unused portions of the foodstuffs as might be retained in the receptacle part, either because the reused lid or container does not appear to be air-tight, or it has unsightly appearance, etc. Thus, she tends to empty the unused portions from the original receptacle part and into usual household receptacles for storage in the refrigerator or elsewhere and therefore the opportunity for the manufacturer to keep his brand name before her, as the same appears on the original package, is lost. This is in addition to the aforesaid difficulty or inconvenience experienced by the housewife in initially removing the lid which, itself, may result in the loss of subsequent sales.

Attempts by manufacturers of such containers to provide a fully reusable lid have been frustrated by the commensurate difficulty of providing a satisfactory sealing of the lid on to the receptacle part. In attempting to overcome the latter difficulty, they have usually been able to only achieve lids or closures which are very difficult to initially remove. This dilemma of difficulties, as have only been compromised heretofore, is effectively resolved by the present invention. That is, the receptacle part may now be provided with an air and liquid tight yet easily opened closure which includes a wholly reusable lid, i.e., one which need not be bent, or torn loose, or otherwise partially destroyed in breaking the container seal.

In its initially sealed condition, the closure provided by the invention is considered tamper-proof for reasons as will become apparent. The seal is easily formed using capping equipment which is not radically different in overall arrangement from existing types, and provides sanitary protection for the foodstuffs within the container. The seal is mold-resistant, and exhibits unusually low moisture and gas transmission characteristics, thus imparting a long shelf-life characteristic of the overall package.

A further difficulty not heretofore adequately overcome is that of providing an effective but subsequently tearable adhesive type seal between a closure made of either paper, plastic such as cellophane or the like, or of metal foil, and a receptacle part made of wax-coated paper. In considering the characteristics of the adhesive itself, it will also be understood that the sealing material is preferably disposed on the lid rather than the receptacle part so that conventional receptacle parts may be used in forming the container, and therefore the adhesive itself should have so-called "non-blocking" characteristics, or be protected, so that the lids may be stacked together and easily handled in conventional lid-feeding machines as are used in the capping operation. The present invention accomplishes these results.

Briefly describing the invention, the receptacle part of the container is made of either paper (which may be wax-coated or wax-impregnated), or of plastic such as polystyrene, which may be coated with polymer coatings such as polyethylene or the like, and includes a conventional outwardly rolled beaded mouth rim. Depending upon whether or not the container lid has a corresponding lid-locking bead, the receptacle part may further include a peripherally extending and outwardly projecting lid-locking bead in vertically spaced relation with respect to, and below the beaded mouth rim.

The receptacle part is closed by a plug type lid, as distinguished from a flush type lid, which incorporates what will be referred to herein as an inner closure and an outer closure which, by a few spots of wax, are initially temporarily tacked together in adjacent but separable relation. In the capping operation, the inner closure, which has an adhesive disposed on its outwardly facing surface, will be heat sealed to the receptacle part and will be destroyed upon opening the container, but the outer closure will not be sealed or crimped to the receptacle part, but rather is of a snap-on type, and will therefore remain wholly intact for convenient removal and subsequent reuse.

Being of the plug type, the outer closure presents a rather large, substantially vertical and peripherally extending wall area which will lie adjacent to the interior surface of the vertical wall of the receptacle part immediately below the beaded mouth rim of the latter when the lid is placed thereon, and it is through this vertically disposed peripheral wall area that sealing heat will be transmitted during the capping operation. At least this peripheral wall area of the outer closure is made of a heat conductive material such as stiff paper or plastic. Polystyrene is the preferred outer closure material. It is thermoplastic, has good heat conductivity yet high resistance to fusion or irregular distortion of itself upon the application of sealing heat.

The inner closure is a laminate comprising a heat conductive layer of impervious material, such as paper, cellophane, aluminum foil, crystal polystyrene or the like, and a layer of heat sensitive adhesive material, to be described. The inner closure is tacked, as by a few wax spots, to the underside of the outer closure, and includes a peripheral portion which lies adjacent the aforementioned peripheral wall of the outer closure. The adhesive layer of the inner closure faces outwardly for contact with the wall of the receptacle part.

The outer closure further includes a peripherally extending and radially projecting top wall at the upper end of the aforesaid vertically disposed peripheral wall, and a downwardly turned and peripherally extending skirt at the outer edge of the top wall so that, together, they envelop all but the underside of the beaded mouth rim of the receptacel part when the lid is placed thereon.

The extreme peripheral edge of the inner closure extends beneath the top wall of the outer closure and projects radially across the space between the aforementioned vertical wall and skirt of the outer closure. This peripheral edge portion of the inner closure remains unsealed during the sealing operation so as to serve as a lip for grasping to tear off the inner closure when the sealed container is to be opened.

The skirt of the outer closure has a series of corrugations therealong, or an inwardly projecting bead which projects towards the underside of the mouth rim bead of the receptacle part and which serves to hold the outer closure on to the beaded mouth rim of the receptacle part in what may be considered snap-on relation, both initially when the lid is sealed on to the receptacle part and subsequently when the outer closure is reused as a cover.

As will be seen, all or at least the central area of both the inner and outer closures may be made of transparent material, so as to permit direct viewing of the container contents.

The two-piece lid as has been thus far generally described is placed on the comestible-filled receptacle part, and heat is applied through the aforementioned vertical, peripherally extending wall of the outer closure to seal the similar peripheral portion of the inner closure to the adjacent interior wall portion of the receptacle part. Where the receptacle part is wax-coated paper, the sealing heat melts the wax coating so that the wax is absorbed by the paper, whereupon the actual adhesive seal between the inner closure and the receptacle part is effected by a direct bonding of the inner closure adhesive coating to the paper of the receptacle part. Thus, a very firm, leak-proof sealing of the container is achieved.

The sealing heat is sufficient to thermoplastically reshape the peripherally extending vertical wall of the outer closure to some extent, thus making it more vertical and tending to press the lid periphery and the adjacent wall portion of the receptacle part more firmly together.

The outer closure is easily removed without removing the sealed inner closure, and without distortion of the outer closure itself since, for all intents and purposes, it is merely in snap-on relation with the sealed receptacle part. After removing the outer closure, the housewife tears off the sealed inner closure to gain access to the container contents. The inner closure tears away from the interior wall portion of the receptacle part easily, and the tearing is conveniently initiated by grasping the aforementioned unsealed extension of the inner closure which extends across the top of the beaded mouth rim of the receptacle part.

Heat sensitive adhesives as are suitable for use in accordance with this invention will be described in more detail hereinafter.

These and other objects, features and advantages of the present invention will become more fully apparent from the following detailed description thereof, when taken together with the accompanying drawings in which:

FIGURE 1 is a fragmentary cross-sectional showing of a lid being moved on to a receptacle part to form a container in accordance with the present invention;

FIGURE 2 is a fragmentary perspective view, to a smaller scale, showing a sealed container in accordance with the invention as the outer closure thereof is being removed during the procedure for opening the container;

FIGURE 3 is an enlarged and fragmentary cross-sectional view of the sealed container during the step of the opening procedure as illustrated in FIGURE 2;

FIGURE 3A is a fragmentary cross-sectional view, to the scale of FIGURE 1, of a modified form of sealed container in accordance with the invention, its outer closure being shown in place;

FIGURE 4 is a perspective view, to a reduced scale, showing another modified form of container in accordance with the invention, its outer closure being shown removed;

FIGURE 5 is a greatly enlarged and fragmentary cross section of the inner closure which is incorporated in a lid for forming a container in accordance with the invention;

FIGURE 6 is a greatly enlarged and fragmentary cross section, similar to FIGURE 5, but showing a modified form of the inner closure;

FIGURE 7 is a diagrammatic showing in perspective of a heat sealing machine as may be used to seal containers in accordance with the inventon; and FIGURE 8 is an enlarged cross-sectional showing of a typical capping disc of the sealing machine of FIGURE 7 to illustrate certain of its details.

Referring first to FIGURE 1 of the drawings, a container in accordance with the invention is generally indicated by reference numeral 20. The container 20 is formed by a receptacle part, generally indicated by reference numeral 21, and a plug-type lid as is generally indicated by reference numeral 22. When the lid 22 is on the receptacle part 21 and sealed in place in the manner as will be described, the container 20 is fully formed.

In the preferred embodiment of the invention, the receptacle part 21 is made of wax coated paper, although it will be understood that the receptacle part might also be made of wax impregnated paper, or of polystyrene or other plastic material. It is formed in any conventional manner of making paper or plastic bodies which serve as receptacles for liquids or comestible items such as cottage cheese, butter, fruit salad and the like as are generally indicated by reference numeral 23 in FIGURE 1 of the drawings. As illustrated in the drawings, the receptacle part 21 has conically tapered form and includes a conventional outwardly rolled beaded rim 24 surrounding its mouth. The receptacle part 21 as shown in FIGURE 1 further includes a peripherally extending and outwardly projecting lid-locking bead 25 in vertically spaced relation with respect to, and below the beaded rim 24 to provide a conventional arrangement for receiving a plug-type lid. However, the lid-locking bead 25 may be omitted as indicated in FIGURE 3A, and as will be explained.

In its condition as initially manufactured and placed on the container receptacle part, the plug-type lid 22 is of two-piece construction, having what will be referred to herein as an outer closure 26 and an inner closure 27. In its slightly modified form as illustrated in FIGURE 3A the outer closure is indicated by reference numeral 26a. These closure elements are initially tacked together, as by a plurality of annularly spaced apart wax spots 28, in manner providing for their ready separation at the time the sealed container 20 is opened, as will be further described. In the preferred embodiment, spots of molten wax are peripherally spaced along the underside of the outer closure 26 (or 26a) at the time when the inner and outer closures are connected together in the manufacturing operation.

Referring to the construction of either of the outer closure embodiments 26 or 26a, it has a flat cover portion 29, an upwardly projecting peripheral wall 31, and a radially outward projecting top wall 36 having a depending peripheral skirt 37.

The flat cover portion 29 includes an annular reinforcing bead 30 of appreciably smaller diameter than that of the cover portion itself so that the bead not only reinforces the cover portion but also facilitates stacking a number of sealed containers 20 one on top of the other.

That is, each tapered receptacle part 21 of such plurality of containers preferably includes a recessed bottom (not illustrated) providing an annular bottom rim which rests on the lid cover portion 29 of the underlying container within the annular zone 29a between the reinforcing bead 30 and the outer periphery of the lid.

In its embodiment as shown by FIGURES 1 and 3, the upwardly projecting peripheral wall 31 of the outer closure 26 includes a radially outward projecting lid-locking bead 32 at its lower end where it joins the cover portion 29 as shown. As previously indicated and as illustrated in FIGURE 3A, the lid-locking bead 32 may be eliminated as, for example, where the comestible item 23 is not such as to develop internal gas pressures, and in other circumstances of use of the container 20. In the FIGURES 1 and 3 embodiment, the wall 31 has a relatively short vertical portion 33 immediately above the lid-locking bead 32 and an outwardly flared or conically tapered upper portion 34. Thus, the outer closure 26 (or 26a) may be described as having a substantially vertical peripherally extending wall 31 whose outwardly facing side (unnumbered) will lie adjacent to the interior surface of the substantially vertical (though tapered) receptacle part wall portion 35 which lies between the beaded rim 24 and the lid-locking bead 25 (where the latter is included) and which portion 35 defines the mouth of the receptacle part. The outer closure further includes a peripherally extending, radially outward projecting top wall 36 at the upper end of its substantially vertical wall 31 as shown, the top wall 36 having a downwardly turned peripheral skirt 37 so that, together, the top wall 36 and skirt 37 will envelop all but the underside of the beaded rim 24 of the receptacle part 21 when the lid 22 has been placed upon the latter.

In one embodiment as best shown in FIGURE 2, the downwardly projecting skirt 37 has a series of annularly spaced apart corrugations 37a therearound which project inwardly toward, and somewhat under the underside of the beaded rim 24 of the receptacle part so as to hold the outer closure on the receptacle part in what may be termed snap-on relation. Incidentally, in addition to holding the outer closure in snap-on relation on the receptacle part, these corrugations 37a also assist in preventing nesting together of a plurality of the lids 22 when stacked in a conventional lid-feeding machine. In an alternative form as illustrated in FIGURE 3A, the skirt 37 has an inwardly turned and continuously extending peripheral bead 37b for snap-on engagement of the outer closure 26a with the receptacle rim 24.

In one of its forms as illustrated in FIGURES 1 and 2, the outer closure 26 is made of one-piece impact or crystal polystyrene plastic material, which may be either transparent or opaque. Although other materials might be used, it is found that polystyrene has high heat conductivity for transmitting heat through the aforesaid vertical wall 31 of the outer closure during the heat sealing operation as will be described, yet does not melt or otherwise irregularly distort itself upon the application of temperatures as are involved in the contemplated heat sealing process, although a limited amount of thermoplastic deformation of the vertical wall 31 will occur during the sealing in accordance with the invention. It becomes apparent that only the vertical wall 31 of the outer closure must be made of material having such characteristics, and that therefore all, or only the central area of the cover portion 29 of the outer closure may be made of other material which has been bonded to such vertical wall material. Thus, for example, and as illustrated in FIGURE 4, only the vertical wall 31 and the outer cover portion zone 29a of the outer closure may be made of polystyrene, whereas the central area 29b of the cover portion 29 may be of other material such as transparent polystyrene, cellophane, etc.

Referring now to the inner closure 27, it is a flat sheet of flexible material, as will be described, which is folded in conforming relation with the undersurface portions of the outer closure 26 (or 26a). Thus, the inner closure 27 may be considered as having a disc-like central portion 38 which lies adjacent to the cover portion 29 of the outer closure; an upwardly turned peripheral wall 39 which lies adjacent to the outer closure wall 31; and a radially outward projecting peripheral lip 40 which underlies the outer closure top wall 36, all as clearly illustrated in FIGURE 1. In the initially manufactured condition of the two-piece lid, the upwardly turned peripheral wall 39 and lip 40 of the inner closure will be pleated as necessary to cause the inner closure 27 to form around the undersurface of the outer closure as shown. As previously mentioned, the inner and outer closure elements are tacked together by wax spots 28. As thus formed having two temporarily connected closure elements, the lid 22 is ready to be applied and sealed to the receptacle part 21 to complete the container 20 of the invention.

However, before proceeding with a description of the manner in which the lid 22 is sealed on to the receptacle part 21, the particular sheet material which is used to make the inner closure 27 will be described.

Referring to the enlarged showing of FIGURE 5 wherein the preferred inner closure sheet material is illustrated, it is seen that the material is a laminate of heat conductive material 41 and heat sensitive adhesive material 42. As may be necessary, the heat conductive material 41 has a coating 43 of gas-impervious and water-impervious material. For example, the heat conductive material 41 may be a sheet of cellophane, in which instance the coating 43 on the upper side thereof would be nitrocellulose, the latter being known as an effective and easily applied substance for water-proofing the cellophane. Of course, the coating material should have the characteristic that it will not bond or seal itself to the underside surfaces of the outer closure upon the application of sealing heat through the latter during the heat sealing operation. Considering the nature of the heat sensitive adhesive material 42 as will be described, and although other sheet materials might also be used, it has been found that, in addition to conventional cellophane, so-called tango cellophane (for filtering out ultra-violet light), or films of polyester, polypropylene, or polyethylene, or aluminum foil are suitable heat conductive materials having high softening point, as might be used. Where aluminum is used, it may be either plain or coated with either polyethylene or nitrocellulose or cellophane, etc., which latter materials would then correspond to the illustrated coating 43. In selecting such material, it should be noted that, considering the type of separable seal which is intended to be formed between the heat conductive sheet material 41 and the receptacle part interior surface 35, the heat conductive material 41 is not intended to assist the actual sealing which takes place as, for example, it would if the sheet material were such as to provide a fibrous reinforcement within the adhesive material 42 itself. Usually the coating 43 will be applied to the heat conductive sheet material 41 during the process of manufacturing the latter so that, as a practical matter, the material 41 with its applied coating 43 may be thought of as a single sheet of film or other flexible material.

In the preferred form of the invention the heat sensitive adhesive material 42 is applied as a coating on the underside of the sheet material 41. Although in the capping operation the material will be heat activated to form the seal only at the periphery of the lid, the coating is applied over the entire area of the sheet material 41 as a manufacturing expedient. That is, the sheet material 41 is coated with both the coating 43 and the heat sensitive adhesive material 42 to provide a finished sheet of inner closure material from which inner closure blanks are cut. The blanks are then formed around and wax-tacked to the underside of the outer closure 26.

Since the heat sensitive material 42 may be exposed to contact with the comestibles 23 within the container, the adhesive material should be non-toxic and otherwise inert so as not to impart undesirable odors, tastes or colors to the comestibles, although these considerations may not be important if ingredients other than edibles are packaged in the container 20. Further, the adhesive material should have so-called "non-blocking" characteristics, or be amenable to shielding in a manner as will be described, so that the finished lids may be stacked in conventional capping machines and automatically fed therefrom without interference with each other as would otherwise be the case if the adhesive material were fully exposed and tacky in nature. Additionally, the adhesive material should not soften or melt at temperatures below the temperature at which the contained comestibles or other ingredients are ordinarily packed as, for example, in hot pack situations. It must form a good bond between the heat conductive sheet material 41 and the material of which the receptacle part 21 is made.

These results are obtained where the heat sensitive material 42 is a blended wax composition. The selection of the wax blend will depend in some measure upon the requirements of the container in its ultimately sealed condition. If the container may be subjected to shock or flexure in handling, a tacky adhesive which retains some flexibility at ambient temperatures is preferred since adhesives which themselves are considered non-blocking in nature are generally less flexible and more brittle. They may crack slightly during shipment and thus possibly rupture the otherwise airtight seal. On the other hand, if the possibility of some cracking can be tolerated, a non-blocking adhesive is preferred for both economy reasons and facility of manufacture. Where adhesive which is tacky in nature at ambient temperatures is utilized, sticking together or other interference between lids as they are handled prior to their placement on the filled receptacles can be avoided by powdering the otherwise exposed face of the adhesive with starch or similar powder, or by disposing a sheet of thin and porous tissue 44 on the face of the adhesive as illustrated in FIGURE 6 wherein such modified form of inner closure material is generally indicated by reference numeral 27a. In this latter embodiment, any one of the heat conductive sheet materials 41 as previously described, and coated or not with the previously described coating 43, may be used. The tissue paper 44 itself is commonly known as "tea bag" tissue having a 10–12 lb. basis weight, and having its lower or otherwise exposed surface coated with a polyethylene coating 45.

Referring again to the inner closure material 27 as illustrated in FIGURE 5, suitable non-blocking adhesives can be prepared from blends of natural or synthetic paraffin wax and various polymers. Suitable polymers include vinyl copolymers such as copolymers of ethylene or other olefines with maleic anhydride, acrylic acid or derivatives thereof, especially lower alkyl esters such as methyl or ethyl methacrylate or ethacrylate. Especially preferred blends suitable for use with wax coated paper containers or uncoated polystyrene containers are prepared from paraffin wax and copolymers of vinyl acetate and ethylene containing from about 27% to about 29% by weight vinyl acetate. One such blend contains 70% by weight of fully refined paraffin wax having an ASTM melt point of 132–134° F. and 30% by weight of the vinyl acetate-ethylene copolymer having a melt index of 12 to 18. This blend is especially preferred because it forms a tenacious bond that is substantially chemically inert.

A non-blocking blend which is especially useful if the comestibles or other ingredients in the container are of a greasy nature is one which contains 35% by weight of a synthetic paraffin wax having an ASTM melt point of 214° F., 30% vinyl acetate-ethylene copolymer of the class described above having a melt index of 2.4 to 3.4, and 35% white microcrystalline wax having an ASTM melt point of 165° F. This blend is substantially unaffected by the usual oils present in greasy foods.

Referring to the inner closure material 27a as illustrated in FIGURE 6, tacky heat sensitive adhesives can be prepared by blending the same or similar ingredients as described above in connection with the preparation of non-blocking adhesives. Addition of a synthetic or natural rubber often improves the flexibility of the blended product. A preferred blend which is useful for the same types of containers described above in connection with non-blocking adhesives, and which is especially suitable for containers which are either coated or formed with polyethylene, or for paper containers which are coated with high melt point wax, contains 63% by weight of an intermediate wax having an ASTM melt point of 157–167° F., 8% by weight butyl rubber, 19% by weight laminating microwax having an ASTM congealing point of 141° F. and 10% by weight of polyisobutylene having an average molecular weight of from 8700 to 10,000. This blend is especially preferred because it forms a strong bond and is substantially colorless and chemically inert. To avoid its tacky nature during handling of the lids as aforesaid, the exposed surface of such adhesive is coated with starch, or with a sheet of tissue 44 as previously mentioned.

Where inner closure sheet material 27a having such tacky type adhesive is used, it will be found that upon application of lid sealing temperatures as will later be referred to, the adhesive 42a permeates through the porous tissue paper 44, or somewhat similarly permeates the starch powder coating if such is used, and thereupon seals the heat conductive sheet material 41 to the basic material of the receptacle part 21.

Referring now to the method and apparatus used in sealing the assembled lid 22 on to the receptacle part 21, the lid 22 is first placed on a comestible-filled receptacle part 21 as indicated by FIGURE 1, the lid 22 being pressed on to the receptacle part to the extent required for its lid locking bead 32 to engage the receptacle part lid locking bead 25 where these lid-locking elements are included, whereupon the lid sealing heat is applied through the outer closure peripheral wall 31. However, where the lids are initially placed on the receptacle parts either by hand or by a capping machine operation, the lid 22 need not be so accurately placed if the heat sealing apparatus as below described will be subsequently used to seal the lid on to the receptacle part.

Referring to FIGURE 7 of the drawings, the receptacle part 21 having the lid 22 initially placed but not yet sealed thereon is fed into a turret type capping machine as is generally indicated by reference numeral 50. The capping machine 50 has a plurality of non-rotating, annularly spaced apart and heated capping discs 51 which revolve about a central axis 52 of the machine and which are each mounted for vertical reciprocating movement. The vertical movement is afforded by the vertical shaft 53 of each capping disc being slidable through a vertical sleeve 54 of each capping disc being slidable through a vertical sleeve 54 of the upper head 55 of the machine, and further being connected through a cam follower (not shown) to a centrally located fixed cam track (not shown) which is in fixed position surrounding the main axis 52 of the machine and on which the cam followers are mounted. Thus, as the table 56 and the upper head 55 of the machine rotate, each non-rotating capping disc 51 will be lowered into pressure engagement with a lid 22 of that container which has been positioned on the table 54 below the capping disc.

Each of the capping discs 51 is heated to a temperature of between 230° F. and 350° F., depending upon the materials used for the outer closure, inner closure and receptacle part as aforesaid, and will be in sealing engagement with one of the container lids for only a brief period of from two to ten seconds. During this period the capping disc 51 is in firm engagement with the lid 22 and exerts a hold down pressure of up to 21 p.s.i. on the top wall 36 (see FIGURE 1) of the lid. Such pressure on the lid rim prevents the outer closure from distorting or shrinking away from the receptacle part beaded rim 24 as might otherwise occur under the influence of the heat of the capping disc.

Referring to FIGURE 8, which shows an enlarged cross section of a typical capping disc 51, it will be understood that each disc 51 has a recessed bottom area, as indicated by reference numeral 57 so that capping heat will be applied only against the peripheral wall 31 of the outer closure, and not to any extent on the cover portion 29 thereof. It will be noted from FIGURE 8 that the outer periphery of each disc 51 includes a downwardly facing pressure surface 51a which exerts the aforementioned clamping pressure on the outer closure top wall 36; an upper vertical portion 51b immediately below the pressure surface 51a; and an inwardly tapered conical portion 51c below the vertical portion 51b as shown. The disc is heated, as by an annularly disposed heating element 58 which lies adjacent the peripheral wall portions 51b and 51c. Thus, and referring now to FIGURE 3 which illustrates the ultimate shape of the outer closure 26 after the sealing operation, it will be understood that during the sealing operation the portions 33 and 34 of the outer closure peripheral wall 31 may be plastically deformed in conformance with the shape of the peripheral portions 51b and 51c of the capping disc 51. This plastic deformation of the outer closure 26 assures slight expansion of the outer closure wall 31 into tight fitting engagement with the receptacle part interior surface 35 which is also slightly deformed, as indicated in FIGURE 3. Although not illustrated, a similar slight deformation of the lid and receptacle part might be effected in the FIGURE 3A embodiment to tighten the seal.

The heat distribution within each disc 51 is such that little or no heat is emitted through the downwardly facing pressure surface 51a thereof so that the lip 40 of the inner closure 27 is not heat sealed to the receptacle part beaded rim 24 during the sealing process, but remains free to serve as a tab for grasping and tearing off the inner closure 27 at the time of opening the sealed container. The unattached relation between the inner closure lip 40 and the receptacle part beaded rim 24 is indicated by dotted lines in FIGURE 3.

Referring again to either FIGURE 2 or 3A, it will be understod that, after the container 20 has been sealed in the described manner, the outer closure 26 or 26a is in snap-on relation with respect to both the receptacle part 21 and the sealed inner closure 27 so that the same may be easily removed by grasping with the fingers at the skirt 37 thereof and lifting the same in upward direction, as indicated by the arrow in FIGURE 2. The few wax spots 28 break apart easily and present no difficulty in removing the outer closure while leaving the inner closure 27 sealed to the receptacle part 21 and intact. It is seen that in so removing the outer closure 26 or 26a, neither the outer closure nor the inner closure is in any way destroyed, distorted, or mutilated.

To gain access to the contents 23 of the container 20, the housewife removes the outer closure 26 or 26a, and thereafter tears open the sealed inner closure 27. It will be found that the adhesive bond between the inner closure sheet material 41 and the material of the receptacle part 21 separates easily. Where the receptacle part 21 is made of wax coated paper, the sealing heat initially causes the receptacle part wax coating to melt and be absorbed into the paper material, whereupon the now molten inner closure adhesive 42 or 42a effects a direct bond between the inner closure material 41 and the paper material of the receptacle part.

When the inner closure 27 has been removed, it will be found that no distortion, mutilation or the like of the receptacle part 21 has occurred, and that the outer closure may be reapplied to the receptacle part in snap-on manner for enclosing unused portions of the comestibles 23 within the receptacle part.

Thus has been described a container and lid which achieves all of the objects of the invention.

What is claimed is:

1. A container comprising a receptacle part including an interior wall surface portion defining an initially open mouth of the receptacle part, and a plug-type lid closing said receptacle part open mouth, said lid comprising an inner closure including a central portion spanning said receptacle part open mouth and a peripheral wall portion projecting generally vertical with respect to said central portion, said inner closure peripheral wall having a layer of heat sealable adhesive material thereon in adhesive sealing engagement with said receptacle part interior wall surface portion to seal closed said open mouth, said heat sealable adhesive material being of wax composition whereby said inner closure peripheral wall is detachable by manual separation from said receptacle part interior wall surface without significant mutilation of the latter, and an outer closure including a central portion and a peripheral wall portion in contiguous but separable relation with the respective of said central and peripheral wall portions of said inner closure.

2. A container comprising a receptacle part including an interior wall surface portion defining an initially open mouth of the receptacle part, said wall surface portion terminating in an outwardly rolled edge providing a beaded mouth rim of said receptacle part, and a plug-type lid closing said receptacle part open mouth, said lid comprising an inner closure including a central portion spanning said receptacle part open mouth and a peripheral wall portion projecting generally vertical with respect to said central portion, said inner closure peripheral wall being sealed to said receptacle part interior wall surface portion to seal closed said open mouth, and an outer closure including a central portion and a peripheral wall portion in contiguous but separable relation with the respective of said central and peripheral wall portions of said inner closure, said outer closure further including outwardly and downwardly projecting means extending over and into engagement under said beaded mouth rim of the receptacle part to hold said outer closure in snap-on relation with respect to the latter.

3. A container according to claim 2 wherein said inner closure further includes an outwardly projecting unsealed portion extending over said beaded mouth rim for grasping to tear said inner closure from said receptacle part.

4. A container according to claim 2 wherein said receptacle part is of wax-coated paper material, and said inner closure peripheral wall comprises a layer of heat sealable adhesive material in adhesive sealing engagement with the paper of said receptacle part interior wall surface portion.

5. A plug-type lid for closing the mouth of a receptacle, comprising an outer closure including a central portion and a peripherally extending wall portion projecting upwardly from said central portion, and an inner closure including a central portion and a peripheral wall portion in contiguous but separable relation with the respective of said central and peripheral wall portions of said outer closure, said inner closure comprising a layer of material immediately adjacent said outer closure and having substantially heat sealable incompatibility with the material of said outer closure, a layer of heat sealable adhesive material disposed on the outwardly facing side of said inner closure at least within the zone of said peripheral wall portion of the latter, said heat sealable adhesive material at least prior to an initial application of heat being tacky at ambient temperatures, and a coating of non-tacky material overlying said heat sealable adhesive material whereby, upon the application of heat, said heat sealable adhesive material substantially permeates said non-tacky material.

6. A plug-type lid according to claim 5 wherein said heat sealable adhesive material is a blended composition consisting essentially of substantially 63% by weight of intermediate wax having an ASTM melt point of 157 to 167° F., substantially 8% by weight of butyl rubber, substantially 19% by weight of laminating microwax having an ASTM congealing point of substantially 141° F., and substantially 10% by weight of polyisobutylene having an average molecular weight of from 8700 to 10,000.

7. A plug-type lid according to claim 5 wherein said coating of non-tacky material comprises starch powder.

8. A plug-type lid according to claim 5 wherein said coating of non-tacky material comprises a sheet of thin and porous paper.

9. A plug-type lid for closing the mouth of a receptacle having a beaded mouth rim, comprising an outer closure and an inner closure, said outer closure comprising a central portion, a peripherally extending wall portion projecting upwardly from said central portion, a peripherally extending top wall projecting outwardly from the upper end of said upwardly projecting wall portion, and a peripherally extending skirt projecting downwardly from the outer peripheray of said top wall in laterally spaced apart relation with respect to said upwardly projecting wall portion to receive said beaded rim of the receptacle, and said inner closure comprising a central portion and a peripherally extending wall portion projecting upwardly from its said central portion, said inner closure central and upwardly projecting wall portions being in contiguous but separable relation with the respective of said central and upwardly projecting wall portions of said outer closure, said inner closure being of laminated material including a layer of sheet material disposed immediately adjacent said outer closure, said sheet material having substantially heat sealable incompatibility with the material of said outer closure, and a layer of heat sealable adhesive material disposed at least within the zone of said upwardly projecting wall portion of the inner closure on the side thereof which is opposite to said outer closure.

10. A plug-type lid according to claim 9 wherein said heat sealable adhesive material is a blended composition consisting essentially of substantially 70% by weight of fully refined paraffin wax having an ASTM melt point of 132 to 134° F., and substantially 30% by weight of vinyl acetate-ethylene copolymer having a melt index of from 12 to 18.

11. A plug-type lid according to claim 9 wherein said heat sealable adhesive material is a blended composition consisting essentially of substantially 35% by weight of synthetic paraffin wax having an ASTM melt point of substantially 214° F., substantially 30% by weight of vinyl acetate-ethylene copolymer having a melt index of 2.4 to 3.4, and substantially 35% by weight of white microcrystalline wax having an ASTM melt point of substantially 165° F.

12. A plug-type lid according to claim 9 wherein said inner closure further includes a peripheral lip extending outwardly from the upper end of its said upwardly projecting wall portion, said inner closure lip being in contiguous but separable relation with respect to the underside of said outer closure top wall.

13. A plug-type lid according to claim 9 wherein said inner and outer closures are separably sealed together by a plurality of annularly spaced apart spots of wax disposed between the cofacing surfaces of said central portions of said inner and outer closures.

14. A plug-type lid for closing the mouth of a receptacle having a beaded mouth rim and a peripherally extending and outwardly projecting lid locking bead in parallel spaced relation to its said beaded rim, said lid comprising an outer closure and an inner closure, said outer closure being of stiff but flexible material and comprising a central portion, a peripherally extending wall portion projecting upwardly from said central portion, said upwardly projecting wall portion including a peripherally extending and outwardly projecting locking bead at its lower end for engaging said lid-locking bead of the receptacle, a peripherally extending top wall projecting outwardly from the upper end of said upwardly projecting wall portion, and a peripherally extending skirt projecting downwardly from the outer periphery of said top wall in laterally spaced apart relation with respect to said upwardly projecting wall portion to receive said beaded rim of the receptacle, said skirt having inwardly turned lower end means for engaging the underside of said receptacle beaded rim in snap-on relation, and said inner closure comprising a central portion, a peripherally extending wall portion projecting upwardly from its said central portion, and a peripherally extending lip projecting outwardly from the upper end of its said upwardly projecting wall portion, said inner closure central and upwardly projecting wall portions and lip being in contiguous but separable relation with the respective of said central and upwardly projecting and top wall portions of said outer closure, said inner and outer closures being separably secured together by a plurality of wax spots, said inner closure including a layer of sheet material disposed immediately adjacent said outer closure and having substantially heat sealable incompatibility with the material of said outer closure, and a layer of heat sealable adhesive material disposed at least within the zone of said upwardly projecting wall portion of the inner closure on the side thereof which is opposite to said outer closure.

15. A plug-type lid according to claim 14 wherein said heat sealable adhesive material has non-blocking characteristics.

References Cited by the Examiner
UNITED STATES PATENTS

| | | | |
|---|---|---|---|
| 2,241,710 | 5/1941 | Lowey | 229—43 X |
| 2,290,749 | 7/1942 | Hildebrandt | 229—5.8 X |
| 2,402,943 | 7/1946 | Bogoslowsky | 229—48 |
| 2,721,686 | 10/1955 | Reifsnyder et al. | 229—5.5 |
| 2,787,410 | 4/1957 | Moore | 229—43 |
| 3,070,275 | 12/1962 | Bostrom | 229—14 |

GEORGE O. RALSTON, *Primary Examiner.*